United States Patent [19]

Beckers

[11] 4,025,270

[45] May 24, 1977

[54] APPARATUS FOR STAMPING CANDY BITS

[75] Inventor: Hans Beckers, Monchengladbach, Germany

[73] Assignee: Robert Bosch G.m.b.H., Stuttgart, Germany

[22] Filed: Nov. 6, 1975

[21] Appl. No.: 629,513

[30] Foreign Application Priority Data

Nov. 29, 1974 Germany .................... 2456480

[52] U.S. Cl. .................... 425/297; 425/353; 425/354
[51] Int. Cl.² .................... B29C 3/00
[58] Field of Search .......... 425/354, 353, 352, 294, 425/296, 297

[56] References Cited

UNITED STATES PATENTS

| | | | |
|---|---|---|---|
| 1,026,682 | 5/1912 | Komarek | 425/354 X |
| 1,848,712 | 3/1932 | Hanns | 425/297 |
| 1,920,445 | 8/1933 | Thurlings | 425/296 X |
| 1,967,565 | 7/1934 | Thurlings | 425/296 X |
| 2,027,915 | 1/1936 | Kux | 425/297 |
| 2,949,082 | 8/1960 | McCarby | 425/353 |
| 3,118,183 | 1/1964 | Gex et al. | 425/353 |
| 3,891,375 | 6/1975 | Pilewski et al. | 425/354 X |

*Primary Examiner*—Robert L. Spicer, Jr.
*Attorney, Agent, or Firm*—Edwin E. Greigg

[57] ABSTRACT

The invention relates to an apparatus for stamping candy bits from a string of confectionary material and comprises coacting rotating members, which are disposed eccentric to each other and arranged to squeeze or cut bits of confection from the string and immediately upon the bit being formed, oppositely disposed stamping elements are introduced into the path of travel of the bit to shape it prior to its being discharged from the apparatus.

8 Claims, 3 Drawing Figures

U.S. Patent  May 24, 1977  4,025,270
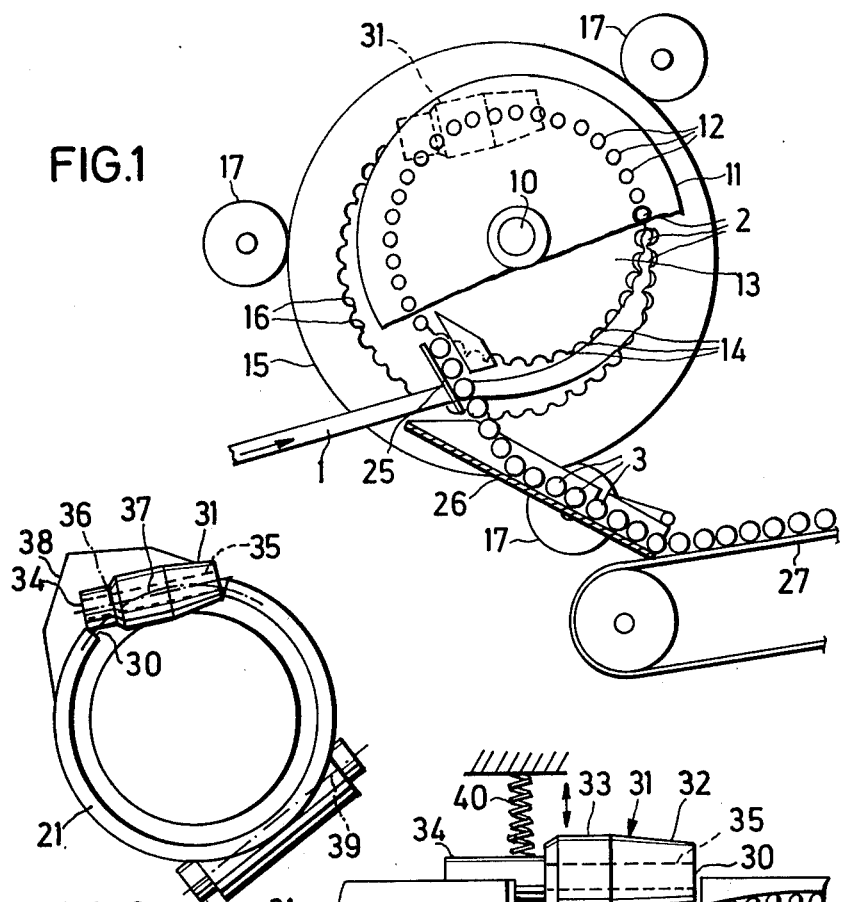
FIG.1
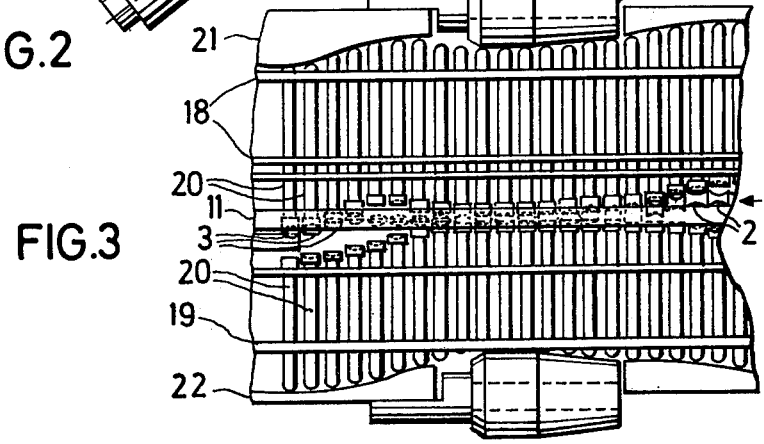
FIG.2
FIG.3

APPARATUS FOR STAMPING CANDY BITS

BACKGROUND OF THE INVENTION

The present invention relates to a device for stamping candy bits from traveling lengths of confectionary material and comprises rotating laterally open stamping chambers into which is arranged to project from opposite sides thereof axially disposed co-rotating stamping dies. The final shaping of the candy blank which has been advanced longitudinally into the stamping chamber is accomplished by the continuous engagement of the stamping dies as they are admitted into the stamping chamber. The device also comprises camways and a roller pressure element which is correlated therewith.

German Pat. Nos. 1,053,913 and 1,295,990 disclose devices of the general type wherein the stamping dies include feet that slide on stationary cam disks or cup disks, the axial lifting motions of which feet cause the respective oppositely disposed surfaces of the stamping dies to be moved against one another. It has been found that the parts of the cams which are exposed to the greatest stamping pressure wear very rapidly, thus necessitating replacement of the cam disks.

For this reason, it has already been proposed to correlate the camways which are particularly susceptible to wear with a roller, the axis of rotation of which extends radially with respect to the axis of rotation of the dies, the arrangement being such that the feet of the stamping dies successively engage the surface of the roller and rotate the same, thus producing a rolling movement between the terminus of the shank of the stamping die foot and the roller. As the transition from the stationary camway to the circular surface of the roller creates an interruption in the thus smooth travel of the stamping die which is constantly being axially displaced, it is exposed to considerable lateral pressure which results in considerable noise, particularly when the stamping dies and chambers are operating at high speed. Since the edge of the camway is interrupted in front of the roller this prevents a smooth operation of the dies and this area as well as the surface area of the roller is subjected to considerable wear and also the degree of noise is further intensified.

OBJECTS AND SUMMARY OF THE INVENTION

The object of the invention is to provide a device of the type described initially which is very durable and operates quietly even at high speeds.

This object is achieved, according to the invention, in that the pressure element consists of a rotatable roller, the axis of rotation of which extends substantially as a secant with respect to the surface of rotation of the axes of the stamping dies.

As the entire surface of the roller forms a group of sliding paths for the stamping dies when the roller is rotated, the service life of the cam ways is considerably increased.

By virtue of the extremely long service life of the roller, it is proposed according to another feature of the invention that the material used for the roller should be softer than the material used for the terminus of the shank of the stamping die. By coordinating the materials in this way, the service life of the entire die structure is also considerably increased. Furthermore, as the rollers can also be produced inexpensively and can easily be replaced, the material used for the rollers can be sufficiently hard or soft to enable the rollers to be considered as elements designed to suffer wear and which can be easily and inexpensively exchanged, either as required, or at specific intervals.

The roller is preferably so arranged with respect to the path of rotation of the stamping dies and its axis is so directed with respect to the surface of rotation of the axes of the stamping dies that the point of engagement of each stamping die is confined to a different surface line of the roller from that of the run-off point. This roller disposition ensures that the dies which slide over the surface of the roller cause the roller to rotate about its axis over a small angle such that the sliding path of the dies on the roller surface constantly changes.

Other objects, features and advantages of the present invention will be made apparent in the following description of a preferred embodiment thereof provided with reference to the accompanying drawing.

BRIEF DESCRIPTION OF THE DRAWING

FIG. 1 is a simplified, cross-sectional view of a candy stamping device;

FIG. 2 is a side view of a cam of the stamping device shown in FIG. 1, and

FIG. 3 is a plan view of a part of the candy stamping device according to FIG. 1.

DESCRIPTION OF THE PREFERRED EMBODIMENT

Turning now to the drawing, a ring 11 comprising laterally open stamping chambers 12 regularly distributed on a circle is mounted on a drive shaft 10. An inner separator ring 13 comprising outwardly directed cutting webs or bars 14 is rigidly connected with the ring 11. An outer separator ring 15 comprising inwardly directed cutting webs or bars 16 is associated with the inner separator ring 13 and disposed in the same plane. The inner diameter of the separator ring 15 is larger than the outer diameter of the inner separator ring 13 and it is eccentrically mounted with respect to the inner separator ring 13 on rollers 17 such that the cutting surfaces 14 and 16 of the two separator rings 13 and 14 cut alternately over a specific angular zone. In this angular zone, the cutting edges 14 and 16 and the intermediate depressions between the cutting edges define chambers which are in alignment with the stamping chambers 12 of the ring 11.

Bearer rings 18, 19 for the stamping dies 20 are rigidly connected with the inner dividing ring 13 and the ring 11. The shafts or shank portions of the stamping dies 20 are displaceably mounted in mounting bores of the bearer rings 18, 19 parallel with the axis of rotation of the rings and are aligned in pairs with the stamping chambers 12 of the ring 11. Spring elements (not shown) urge the stamping dies 20 laterally away from the ring 11 against the stationary camways 21, 22 on which their cap-shaped feet are able to slide. These camways 21, 22 which are also known as pot-cams, each have a sloping surface to provide a path for the stamping die 20. These paths control the axial movement of the pair of stamping dies by means of axially projecting or recessed zones in such a way that in the zone in which a candy string 1 is inserted into the device and in the angular region in which the dividing rings 13, 15 roll off against one another and cut the candy string 1 into individual candy blanks 2, the stamping dies 20 are axially drawn away from the ring 11 and the separator rings 13, 15. In the regions disposed after the rings 11, 13, 15 roll off against one another in the direction of rotation, the stamping dies 20 are inserted into the stamping chambers 12 while the dies 20 disposed on the side of the dividing rings 13, 15 each insert a candy blank 2 into the associated stamping chamber 12 and a pair of stamping dies 20 each press the candy blank 2 in the stamping chamber 12 from opposite sides while maintaining pressure thereon for a short period of time. It is also to be noted that the stamping dies 20 disposed on the side of the ring 11, are moved back into their starting position and the opposed stamping dies 20 are first advanced so that the finished candy bits 3 are ejected from the stamping chambers and they are then also returned to their starting position. The candy bits 3 are then guided onto a conveyor belt 27 via chutes 25, 26.

In the angular region of the path of rotation of the stamping chambers 12 and stamping dies 20, in which the stamping dies are moved against one another while applying pressure on the candy blanks, there is interposed between the camways a roller 31 the radii of the outer surface of which correspond to the path of travel of the shafts of the dies 20 from an inoperative position to a condition where pressure is exerted on the candy bits. The roller 31 has a cylindrical part 33 and an integral part 32 which includes a frustum, all of which is clear from the view in FIG. 3. The roller 31 is rotatably mounted on a bearing block 34 and includes projecting journal portions 35. The bearing block 34 is bolted to the camway 21 or 22 and thus can easily be removed and replaced to change the roller.

The roller 31 is positioned in a recess 30 between the camways 21, 22 in such a way that its axis 36 extends as a tangent or a secant in the direction of rotation of the stamping dies 20 with respect to the surface of rotation 37 of the axes of the stamping dies 20 or with respect to their central disposition on the camways 21, 22 (FIG. 2). The axis 36 is preferably so disposed with respect to the surface of rotation that the point of engagement and run-off point of a stamping die 20 on the roller 31 do not lie on the same surface line of the roller. As a result, automatic rotation of the roller 31 by means of the rotating stamping dies 20 is achieved. In this way, a new sliding path is automatically provided for the individual stamping dies 20. As a result, the service life of the cams is considerably increased as long as they are kept well lubricated, as in the case of the known devices.

On account of the long service life of the rollers 31, these can be made of a material which is softer than the material used for the terminus of the stamping dies 20. The material used for the rollers 31 is preferably even substantially softer than that used for the feet of the stamping dies 20. As a result, the rollers 31 which can be produced inexpensively and easily replaced, can be considered as disposable items which can be replaced as necessary or at specific intervals. By coordinating materials in this way the service life of the device is considerably increased. To adapt the path of the stamping dies 20 to the slightly varying thickness of the candy string, one of the camways 21, 22 and the associated roller 31 are attached to a rocker 38 which is pivotable about an axis 39 disposed away from the surface of the camway 21--substantially diametrically opposite to the roller 31. The rocker 38 is supported by a compression sring 40.

What is claimed is:

1. A device for stamping candy bits from a continuous length of confectionary material, comprising revolving laterally open stamping chambers on both sides of which are provided co-revolving axially and oppositely disposed stamping dies which finally shape the material as it is moved into a stamping chamber, said stamping dies being advanced by paired camways and an intervening pressure element into the respective stamping chamber to perform the stamping operation, the candy bit being thereby caused to project into a recess in the stamping zone, characterized in that the pressure element consists of a rotatable roller, the axis of rotation of which extends substantially as a secant with respect to the surface of revolution defined by the axes of the stamping dies.

2. A device as claimed in claim 1, characterized in that the roller includes an axis that is so disposed with respect to the surface of revolution of the axes of the stamping dies that the point of engagement of the stamping die with the roller lies on constantly changing meridian curves as the die travels the extent thereof.

3. A device as claimed in claim 2, characterized in that the roller is constructed of a material which is softer than a shank portion which supports said stamping die.

4. A device as claimed in claim 1, characterized in that said roller is flexibly supported relative to said camway.

5. A device as claimed in claim 4, characterized in that the roller and the camway are pivotable about an axis disposed beyond the surface of the camway and diametrically opposite the respective roller.

6. A device as claimed in claim 1, characterized in that the stamping dies include shank portions, said shank portions being caused to rotate about their longitudinal axes as they travel lengthwise of said roller.

7. A device as claimed in claim 1, wherein said roller includes adjacent surface zones of frustoconical shape.

8. A device for stamping candy bits from a continuous length of confectionary material, comprising revolving laterally open stamping chambers on both sides of which are provided co-revolving axially and oppositely disposed stamping dies which finally shape the material as it is moved into a stamping chamber, said stamping dies being advanced by paired camways and an intervening pressure element into the respective stamping chamber to perform the stamping operation, the candy bit being thereby caused to project into a recess in the stamping zone, characterized in that the pressure element consists of a rotatable roller, the axis of rotation of which extends parallel to an imaginary secant or tangent disposed to the path of rotation of the foot ends of the stamping dies.

* * * * *